United States Patent
Fukuda et al.

(10) Patent No.: US 8,263,233 B2
(45) Date of Patent: Sep. 11, 2012

(54) FRAME MEMBER FOR USE IN TWO-WHEELED VEHICLE AND ALL-TERRAIN VEHICLE, AND METHOD FOR PRODUCING THE SAME

(75) Inventors: Toshihiko Fukuda, Ohbu (JP); Tadashi Minoda, Nagoya (JP); Kyo Takahashi, Wako (JP); Yukihide Fukuda, Wako (JP)

(73) Assignees: Sumitomo Light Metal Industries, Ltd., Minato-Ku (JP); Honda Motor Co., Ltd., Minato-Ku (JP)

( * ) Notice: Subject to any disclaimer, the term of this patent is extended or adjusted under 35 U.S.C. 154(b) by 0 days.

(21) Appl. No.: 13/152,382

(22) Filed: Jun. 3, 2011

(65) Prior Publication Data

US 2011/0236718 A1 Sep. 29, 2011

Related U.S. Application Data

(63) Continuation of application No. PCT/JP2010/059209, filed on May 31, 2010.

(30) Foreign Application Priority Data

Jun. 5, 2009 (JP) .................................. 2009-136459
Jul. 9, 2009 (JP) .................................. 2009-162382

(51) Int. Cl.
*B32B 1/08* (2006.01)
*B32B 15/01* (2006.01)
*B32B 15/04* (2006.01)
*B32B 15/20* (2006.01)
*B23K 9/00* (2006.01)
*B23K 31/02* (2006.01)
*B23K 101/06* (2006.01)
*B23K 103/10* (2006.01)
*C22F 1/047* (2006.01)
*C22F 1/053* (2006.01)

(52) U.S. Cl. ........ 428/654; 428/34.1; 148/535; 148/688; 148/698; 148/701; 296/203.01; 296/205; 228/262.51

(58) Field of Classification Search .................. 428/654, 428/34.1
See application file for complete search history.

(56) References Cited

U.S. PATENT DOCUMENTS 6,524,410 B1 * 2/2003 Kramer et al. ................ 148/550

FOREIGN PATENT DOCUMENTS

| JP | 56-077358 A1 | 6/1981 |
|---|---|---|
| JP | 60-194041 A1 | 10/1985 |
| JP | 01-143791 A1 | 6/1989 |
| JP | 05-078773 A1 | 3/1993 |
| JP | 10-168553 A1 | 6/1998 |
| JP | 2001-115227 A1 | 4/2001 |

OTHER PUBLICATIONS

Matweb Overview of materials for 7000 Series Aluminum Alloy, downloaded from www.matweb.com on Dec. 17, 2011, 3 pages, (no date).*
Matweb Aluminum 5356-O, downloaded from www.matweb.com on Dec. 17, 2011, 2 pages, (no date).*
Mitsuhiro Ema, "*Tensile Strength of MIG-Welded 7000 Series Aluminum Alloy Extrusions*," "Keikinzoku Yousetsu" (Light Metal Welding), vol. 45, No. 10, (2007), pp. 461-470.
Aluminum Handbook (7th Edition), Japan Aluminum Association, Jan. 31, 2007, pp. 130-133.

* cited by examiner

*Primary Examiner* — Michael La Villa
(74) *Attorney, Agent, or Firm* — Burr & Brown

(57) ABSTRACT

A frame member for use in a two-wheeled vehicle and an all-terrain vehicle that includes a plurality of Al members each made of a 7000 series Al alloy having a high strength is provided in which weld crack sensitivity is reduced and a weld joint having an excellent strength is provided. The alloy composition of the 7000 series Al alloy, which provides the Al member, containing Cu: 0.01 to 0.50%, Mg: 0.5 to 2.1%, and Zn: 4.0 to 8.5%, with the balance being Al and inevitable impurities. Further, in the production of the frame member, the plurality of Al members are integrated by welding using a filler metal containing Mg: 5.5 to 8.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less, and with the balance being Al and inevitable impurities.

10 Claims, No Drawings

FRAME MEMBER FOR USE IN TWO-WHEELED VEHICLE AND ALL-TERRAIN VEHICLE, AND METHOD FOR PRODUCING THE SAME

CROSS-REFERENCE TO RELATED APPLICATIONS

This application is a continuation of the International Application No. PCT/JP2010/059209 filed May 31, 2010, which claims the benefit under 35 U.S.C. §119(a)-(d) of Japanese Patent Application No. 2009-136459, filed Jun. 5, 2009 and Japanese Patent Application No. 2009-162382 filed Jul. 9, 2009, the entireties of which are incorporated herein by reference.

FIELD OF THE INVENTION

The present invention relates to a frame member for use in a two-wheeled vehicle and an all-terrain vehicle (ATV) and a method of producing the same. More particularly, the present invention relates to a frame member for use in a two-wheeled vehicle and an all-terrain vehicle that is obtained by integrating a plurality of Al members each made of a 7000 series aluminum (Al) alloy having a high strength by welding, and a method of producing the same. The four-digit numbers such as "7000" used herein indicate aluminum alloys defined in AA standard or JIS standard.

BACKGROUND ART OF THE INVENTION

In recent years, from the viewpoint of protecting the global environment, vehicles are demanded to have low fuel consumption by reducing the weight thereof. In order to meet the demand, in the vehicles such as a two-wheeled vehicle and an all-terrain vehicle, as a frame member that constitutes a vehicle frame thereof, a frame member made of aluminum (Al) material has been employed. The frame member for use in a two-wheeled vehicle and an all-terrain vehicle requires a high tensile strength of 250 MPa or more. Thus, 7000 series Al alloy extruded materials (Al—Zn—Mg series) such as 7003 and 7N01, which are defined in the above-mentioned AA or JIS, have been conventionally used. Further, since the shape of the vehicle frame is complicated, the frame member that constitutes a final shape or at least one part of a structure of the vehicle frame for the two-wheeled vehicle and all-terrain vehicle is comprised of a plurality of Al members. The plurality of Al members is subjected to a fusion welding by welding processes such as TIG and MIG to be an integrated member. However, when a filler metal made of a 4000 series Al alloy (Al—Si series) such as 4043 or 4047 is used in the fusion welding, there is a problem in which the integrated Al members are fractured at a weld metal region or portion that has a low strength, because a weld metal has a low strength.

In order to improve the strength of the weld metal region formed in the fusion welding of the Al members made of 7000 series Al alloys, "KEIKINZOKU YOUSETSU" (Light metal welding), Vol. 45, No. 10, pp. 461-470 (2007) proposes a filler metal that is made of a 5000 series Al alloy (Al—Mg series) such as 5554, 5356, or 5183 for use in the fusion welding. However, for a further reduction in weight of the frame member for the two-wheeled vehicle and all-terrain vehicle, if the amount of Mg, Zn, or Cu in the 7000 series Al alloy, which provides the Al member constituting the frame member, is increased to reduce the thickness and improve the strength thereof, the conventional filler metal made of a 5000 series Al alloy cannot sufficiently lower the weld crack sensitivity. Thus, there is inherently problem in which the weld metal region has a lower strength than a heat-affected zone (HAZ) in a base material.

Further, as the 7000 series Al alloy has a high weld crack sensitivity, in order to reduce the weld crack sensitivity, JP-A-1-143791 proposes an Al alloy filler metal containing Mg: 6-10 wt % and Zr: 0.25-1.5 wt %. However, such a filler metal also inherently has various problems. Specifically, such a filler metal contains a large amount of Zr, so that a large crystallized product is formed in a metal structure. Thus, in the production of a filler metal having a diameter of 1.6 mm, 2.4 mm or the like, the large crystallized product adversely affects the wire drawing and causes a problem of cutting or the like in the middle of the wire drawing, which results in the reduction of productivity. In addition, the large crystallized product may be generated in the weld metal due to the presence of a large amount of Zr. Thus, characteristics of the weld joint may be unstable.

SUMMARY OF THE INVENTION

The present invention has been made in the light of the situations described above. It is therefore an object of the present invention to provide a frame member for use in a two-wheeled vehicle and an all-terrain vehicle that comprises a plurality of Al members each made of a 7000 series Al alloy having a high strength or hardness, in which weld crack sensitivity is reduced and a weld joint having an excellent strength is provided.

Thus, the object of the present invention is to provide a frame member for use in a two-wheeled vehicle and an all-terrain vehicle, comprising a plurality of Al members each made of a 7000 series Al alloy containing Cu: 0.01 to 0.50%, Mg: 0.5 to 2.1%, and Zn: 4.0 to 8.5% on a mass basis, the balance consisting of Al and inevitable impurities, the plurality of Al members being integrated by welding and subjected to one of a T4 treatment and a T6 treatment, wherein the plurality of Al members are integrally connected by means of a weld joint formed by welding using a filler metal containing Mg: 5.5 to 8.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less on a mass basis, the balance consisting of Al and inevitable impurities.

According to a preferable aspect of the frame member for use in a two-wheeled vehicle and an all-terrain vehicle of the present invention, the filler metal further contains Mn: 0.05 to 1.0% by mass. Thus, a weld metal region can be advantageously tougher.

Further, in the present invention, preferably, the 7000 series Al alloy contains Mg in an amount of 1.0 to 2.1% by mass, more preferably, Mg in an amount of 1.2 to 2.1% by mass and Zn in an amount of 5.0 to 8.5% by mass.

Particularly, in the present invention, it is preferable that the 7000 series Al alloy contain Mg in an amount of 1.2 to 2.1% by mass and Zn in an amount of 6.0 to 8.5% by mass. It is further preferable that the 7000 series Al alloy contain Mn in an amount of 1.3 to 2.1% by mass and Zn in an amount of 7.5 to 8.5% by mass.

It is another object of the present invention to provide a method of producing a frame member for use in a two-wheeled vehicle and an all-terrain vehicle, comprising the steps of: welding a plurality of Al members each made of a 7000 series Al alloy by using a filler metal to prepare a joined product, the 7000 series Al alloy containing Cu: 0.01 to 0.50%, Mg: 0.5 to 2.1%, and Zn: 4.0 to 8.5% on a mass basis, the balance consisting of Al and inevitable impurities, and the filler metal containing Mg: 5.5 to 8.0%, Cr: 0.05 to 0.25%, Ti:

0.25% or less, Si: 0.4% or less, Fe: 0.4% or less, Cu: 0.1% or less, Zr: 0.05% or less and Zn: 0.25% or less on a mass basis, the balance consisting of Al and inevitable impurities, and performing one of a T4 treatment and a T6 treatment on the joined product.

According to a preferable aspect of the method of producing a frame member for use in a two-wheeled vehicle and an all-terrain vehicle of the present invention, the plurality of Al members are welded by one of arc welding, laser welding, and electron beam welding.

In the present invention, it is more preferable that the T4 treatment include a solution heat treatment that is performed on the plurality of Al members before welding and a natural aging treatment that is performed on the joined product obtained by welding.

In the present invention, it is more preferable that the T6 treatment include a solution heat treatment that is performed on the plurality of Al members before welding and an artificial aging treatment that is performed on the joined product obtained by welding.

As described above, in the frame member for use in a two-wheeled vehicle and an all-terrain vehicle of the present invention, the 7000 series Al alloy, which provides a plurality of Al members constituting the frame member, has an alloy composition containing a specific amount of Cu, Mg and Zn. Therefore, strength of a base material is effectively improved, and a high strength of the frame member as a whole can be advantageously secured.

Further, when the plurality of base materials (Al members) to which a high strength is provided is integrated by welding, a filler metal having an alloy composition in which Mg, Zr, Si, Fe, Cu, Cr, Zn and Ti are contained in specific amounts and the balance consists of Al and the inevitable impurities is used, thereby effectively improving the characteristics such as strength, elongation and the like of a connection region (welded region or weld metal region) of the Al members, and advantageously reducing weld crack sensitivity. Thus, a sound weld joint that has a high strength can be stably obtained.

DETAILED DESCRIPTION OF THE INVENTION

As disclosed in Japanese Patent No. 2757181, Japanese Patent No. 3869122, Japanese Patent No. 3933314 and the like, the frame member for use in a two-wheeled vehicle and an all-terrain vehicle of the present invention constitutes at least one part of a vehicle body frame of a two-wheeled vehicle or an all-terrain vehicle and is constituted by integrating a plurality of Al members by welding. In the present invention, the Al member is made of a 7000 series Al alloy that contains Cu, Mg, and Zn in specific amounts, and the balance consisting of Al and inevitable impurities.

Cu (copper), which is a constituent of the 7000 series Al alloy providing the Al member of the present invention, has effects of improving a strength of the Al member and improving a resistance to stress corrosion cracking. However, when Cu is contained in the 7000 series Al alloy in an amount less than 0.01% (by mass, hereinafter the same), the effects cannot be sufficiently expected. Thus, at least, Cu is contained in an amount of 0.01% or more. However, when the amount of Cu is increased too much, extrusion formability of the Al member is deteriorated and quench sensitivity of the Al member is raised, which results in delay of quenching even if the Al member is rapidly cooled immediately after the extrusion. As a result, sufficient strength cannot be obtained even if a T4 treatment or a T6 treatment is performed. Thus, the upper limit of the amount of Cu must be 0.50%.

Further, Mg (magnesium) is a main element to improve the strength of the Al alloy. In order to sufficiently obtain the effect of Mg, Mg must be contained in an amount of 0.5% or more. However, when the amount of Mg is increased too much, although the strength of the Al alloy is increased, elongation thereof is deteriorated, which also deteriorates processability thereof, and extrusion pressure is raised in the extrusion casting of the Al member. As a result, it may be difficult to perform the extrusion operation. Therefore, the upper limit of the amount of Mg must be 2.1%. Preferably, Mg is contained in an amount of 1.0 to 2.1%, more preferably 1.2 to 2.1%, and especially 1.3 to 2.1%, in order to advantageously attain the excellent effect obtained by containing Mg.

Further, Zn (zinc) is an element that coexists with Mg to provide aging properties to the Al alloy and that improves the strength of the Al alloy by a predetermined aging treatment. In order to sufficiently exhibit the effect of Zn, Zn is contained in an amount of 4.0% or more. However, when the amount of Zn is increased too much, although the strength of the Al alloy is improved, elongation thereof is deteriorated, which may result in the deterioration of processability and easy occurrence of crack during extrusion. Therefore, the amount of Zn must be 8.5% or less. Preferably, Zn is contained in the range of 5.0 to 8.5%, more preferably 6.0 to 8.5%, and especially 7.5 to 8.5%.

The Al member made of the 7000 series Al alloy having the above-described alloy composition is produced in various known forms such as a solid structure, hollow structure, profile, thick plate and the like by known casting methods such as extrusion casting, forging casting, die casting and the like, after a billet or the like is obtained by using the Al alloy. Then, it is used as the Al member of the present invention to form the intended frame member for use in a two-wheeled vehicle and an all-terrain vehicle.

In the present invention, when the Al members obtained as above are integrated by welding to provide the intended frame member, a welding operation that uses a filler metal having a specific alloy composition is employed. By a weld joint generated by the welding operation, the Al members are integrated, and the intended frame member for use in a two-wheeled vehicle and an all-terrain vehicle is formed with excellent characteristics.

The filler metal used in the present invention has the specific alloy composition containing Mg: 5.5 to 8.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less, and the balance consisting of Al and inevitable impurities. When any one of them is contained in an amount out of the range, various problems will be occurred.

Specifically, Mg is an essential element to improve the strength of the weld metal and must be contained in an amount of 5.5% or more in order to sufficiently obtain the effect thereof. However, when the amount of Mg exceeds 8.0%, an embrittled layer is formed in a metal structure. As a result, it becomes difficult to perform a drawing, and the filler metal having intended diameter cannot be obtained.

Cr (chromium) has an effect to reduce the weld crack sensitivity, and is contained in an amount of 0.05% or more. However, when the amount exceeds 0.25%, a large crystallized product is generated in the metal structure. Thus, it may be difficult to perform the drawing operation to obtain the filler metal.

Ti (titanium) has a refining effect to the metal structure, and is contained in an amount of 0.25% or less. When the amount of Ti is increased too much, a large crystallized product is generated in the metal structure. Thus, it may be difficult to perform the drawing operation.

All of Si (silicon), Fe (iron), Cu, Zr (zirconium) and Zn are impurity elements and must be contained in amounts less than the above-defined amounts for the following reasons. When the amount of Si is increased too much, a Mg—Si embrittled layer is formed, so that the strength of a bonding region that is a border region between the base material and the weld metal region may be deteriorated. When the amount of Fe is increased too much, a large crystallized product is generated, so that it may be difficult to perform the drawing. When the amount of Cu is increased too much, the weld crack sensitivity may be increased. When the amount of Zr is increased too much, a large crystallized product is generated, so that it may be difficult to perform the drawing. When the amount of Zn is increased too much, a Mg—Zn embrittled layer is formed, so that the characteristics of a weld joint region may be deteriorated.

Further, in the present invention, in addition to the above alloy composition of the filler metal, Mn (manganese) is advantageously contained in an amount of 0.05 to 1.0%, preferably 0.5 to 1.0%. The additional alloy constituent of Mn helps the weld metal to be tougher and Mn must be contained in the amount of 0.05% or more in order to sufficiently obtain the effect thereof. However, when the amount of Mn is increased too much, a coarse Al—Mn crystallized product (intermetallic compound) is generated in the casting of billet for wire, so that it may be difficult to perform the drawing, for example.

The filler metal of the present invention is produced by using the Al alloy having the above-described alloy composition and is used as a welding rod or electrode wire of the diameter and diameter tolerance defined in JIS-Z-3232.

In the welding of the plurality of Al members by using the filler metal, any process is suitably employed from known fusion welding processes including arc welding processes such as MIG welding and TIG welding, laser welding, and electron beam welding, to integrally connect the plurality of Al members by means of the weld joint formed by the above-described filler metal, thereby obtaining the joined product providing the frame member, which has the intended shape and structure, for use in a two-wheeled vehicle and an all-terrain vehicle.

Then, thus obtained joined product of the present invention in which the plurality of Al members are integrally connected is finished as the intended frame member for use in a two-wheeled vehicle and an all-terrain vehicle after the joined product is subjected to a T4 or T6 treatment. Here, the T4 treatment includes a solution heat treatment and a natural aging treatment and the T6 treatment includes a solution heat treatment and an artificial aging treatment, which are performed in the conventional manner. The T4 treatment or the T6 treatment is performed according to various known processes such that the joined product obtained by welding as above has a history of the predetermined solution heat treatment and the natural aging treatment or the artificial aging treatment. Generally, the intended frame member for use in a two-wheeled vehicle and an all-terrain vehicle is obtained by the steps of: performing the predetermined solution heat treatment on the Al members before welding: integrally joining the Al members by using the weld joint formed by the above-described fusion welding: and performing the natural aging treatment or artificial aging treatment such that the joined product is generally subjected to the T4 treatment or the T6 treatment.

In the solution heat treatment of the T4 treatment or the T6 treatment, generally, a temperature of 450 to 520° C. is maintained for 0.5 to 10 hours. In the artificial aging treatment of the T6 treatment, generally, 90 to 210° C. is maintained for 3 to 24 hours.

In the frame member for use in a two-wheeled vehicle and an all-terrain vehicle of the present invention obtained as described above, the plurality of Al members, which constitutes the frame member, is made of the specific 7000 series Al alloy having a high strength and is integrated by the weld joint formed by using the specific filler metal. Thus, the excellent strength is exhibited and weld crack sensitivity is reduced even at the weld joint region. As a result, the frame member for use in a two-wheeled vehicle and an all-terrain vehicle that has excellent characteristics: the base material strength of 250 MPa or more, the joint strength of 200 MPa or more, and the joint elongation of 4% or more, can be obtained. Thus, the frame member can be advantageously used as a member for constituting at least one part of the vehicle frame of a two-wheeled vehicle and an all-terrain vehicle.

EXAMPLES

To further clarify the present invention, some examples of the present invention will be described. It is to be understood that the present invention is not limited to the details of the description of such examples, but may be embodied with various changes, modifications and improvements that may occur to those skilled in the art, without departing from the scope of the invention.

First, 7000 series Al alloys having various alloy compositions indicated in the following Table 1 to Table 3 were melted and casted by a common DC casting method to produce various billets. Second, the obtained billets were each direct-extruded according to a common procedure after being subjected to a homogenization, thereby obtaining various flat Al members (plates) each having a thickness of 3 mm. Then, the respective various Al members were subjected to a solution heat treatment of 460° C.×1 hour, thereby producing various test base materials for welding test, which will be describe later. Further, a part of the respective various base materials obtained after the solution heat treatment was subjected to an aging treatment of 150° C.×8 hours, thereby obtaining T6 tempered various base materials. Then, the tensile strength of each of the various base materials was measured. The results thereof are shown in Table 1 to Table 3.

Meanwhile, as for the filler metal, billets were produced in the same way as above after Al alloys made of various alloy compositions shown in the following Table 4 to Table 6 were melted and casted. Then, materials for drawing were obtained by extruding the billets. After that, the intended various filler metals were produced as welding wires each having a diameter of 1.6 mm, by conventional drawing process.

TABLE 1

| Base Material | Alloy composition (% by mass) | | | | Strength of Base |
|---|---|---|---|---|---|
| No. | Zn | Mg | Cu | Al* | Material [MPa] |
| 1 | 4.0 | 0.5 | 0.05 | Balance | 255 |
| 2 | 8.5 | 0.5 | 0.47 | Balance | 441 |
| 3 | 6.3 | 0.8 | 0.44 | Balance | 424 |
| 4 | 4.0 | 1.0 | 0.45 | Balance | 367 |
| 5 | 8.5 | 1.0 | 0.29 | Balance | 459 |
| 6 | 4.0 | 1.1 | 0.14 | Balance | 445 |
| 7 | 8.5 | 1.1 | 0.44 | Balance | 492 |
| 8 | 5.0 | 1.2 | 0.35 | Balance | 477 |
| 9 | 8.5 | 1.2 | 0.32 | Balance | 482 |
| 10 | 4.0 | 2.1 | 0.45 | Balance | 489 |
| 11 | 5.0 | 2.1 | 0.49 | Balance | 499 |

TABLE 1-continued

| Base Material No. | Alloy composition (% by mass) | | | | Strength of Base Material [MPa] |
|---|---|---|---|---|---|
| | Zn | Mg | Cu | Al* | |
| 12 | 5.1 | 1.3 | 0.19 | Balance | 472 |
| 13 | 8.5 | 1.3 | 0.08 | Balance | 479 |
| 14 | 6.0 | 1.3 | 0.27 | Balance | 492 |
| 15 | 8.5 | 1.3 | 0.34 | Balance | 514 |
| 16 | 5.1 | 2.1 | 0.33 | Balance | 504 |
| 17 | 6.0 | 2.1 | 0.07 | Balance | 487 |
| 18 | 6.1 | 1.4 | 0.06 | Balance | 488 |
| 19 | 7.5 | 1.4 | 0.48 | Balance | 534 |
| 20 | 6.8 | 1.7 | 0.21 | Balance | 512 |
| 21 | 6.1 | 2.1 | 0.12 | Balance | 503 |
| 22 | 7.5 | 2.1 | 0.24 | Balance | 524 |
| 23 | 7.6 | 1.4 | 0.33 | Balance | 541 |
| 24 | 8.5 | 1.4 | 0.35 | Balance | 551 |
| 25 | 8.0 | 1.7 | 0.17 | Balance | 552 |
| 26 | 7.6 | 2.1 | 0.44 | Balance | 591 |
| 27 | 8.5 | 2.1 | 0.14 | Balance | 584 |

*including inevitable impurities

TABLE 2

| Base Material No. | Alloy Composition (% by mass) | | | | Strength of Base material [MPa] |
|---|---|---|---|---|---|
| | Zn | Mg | Cu | Al* | |
| 31 | 4.0 | 0.5 | 0.11 | Balance | 261 |
| 32 | 8.5 | 0.5 | 0.24 | Balance | 418 |
| 33 | 6.3 | 0.8 | 0.11 | Balance | 391 |
| 34 | 4.0 | 1.0 | 0.10 | Balance | 332 |
| 35 | 8.5 | 1.0 | 0.50 | Balance | 480 |
| 36 | 4.0 | 1.1 | 0.10 | Balance | 441 |
| 37 | 8.5 | 1.1 | 0.28 | Balance | 476 |
| 38 | 5.0 | 1.2 | 0.08 | Balance | 450 |
| 39 | 8.5 | 1.2 | 0.04 | Balance | 454 |
| 40 | 4.0 | 2.0 | 0.05 | Balance | 449 |
| 41 | 5.0 | 2.0 | 0.06 | Balance | 456 |
| 42 | 5.1 | 1.3 | 0.09 | Balance | 462 |
| 43 | 8.5 | 1.3 | 0.38 | Balance | 509 |
| 44 | 6.0 | 1.3 | 0.46 | Balance | 511 |
| 45 | 8.5 | 1.3 | 0.01 | Balance | 481 |
| 46 | 5.1 | 2.1 | 0.49 | Balance | 520 |
| 47 | 6.0 | 2.1 | 0.06 | Balance | 486 |
| 48 | 6.1 | 1.4 | 0.19 | Balance | 502 |
| 49 | 7.5 | 1.4 | 0.10 | Balance | 496 |
| 50 | 6.8 | 1.7 | 0.04 | Balance | 495 |
| 51 | 6.1 | 2.1 | 0.43 | Balance | 534 |
| 52 | 7.5 | 2.1 | 0.12 | Balance | 512 |

*including inevitable impurities

TABLE 3

| Base Material No. | Alloy Composition (% by mass) | | | | Strength of Base Material [MPa] |
|---|---|---|---|---|---|
| | Zn | Mg | Cu | Al* | |
| 53 | 7.6 | 1.4 | 0.20 | Balance | 528 |
| 54 | 8.5 | 1.4 | 0.29 | Balance | 545 |
| 55 | 8.0 | 1.7 | 0.37 | Balance | 572 |
| 56 | 7.6 | 2.1 | 0.39 | Balance | 585 |
| 57 | 8.5 | 2.1 | 0.01 | Balance | 571 |
| 58 | 3.5 | 2.1 | 0.37 | Balance | 277 |
| 59 | 8.5 | 0.3 | 0.14 | Balance | 254 |
| 60 | 9.1 | 2.0 | 0.33 | Balance | 588 |
| 61 | 5.1 | 0.4 | 0.12 | Balance | 255 |
| 62 | 7.5 | 2.8 | 0.29 | Balance | 607 |
| 63 | 6.8 | 1.3 | 0.005 | Balance | 483 |
| 64 | 6.0 | 1.9 | 0.59 | Balance | 550 |
| 65 | 8.1 | 0.7 | 0.27 | Balance | 385 |
| 66 | 6.2 | 1.0 | 0.31 | Balance | 389 |
| 67 | 6.1 | 1.4 | 0.38 | Balance | 503 |
| 68 | 5.5 | 0.6 | 0.34 | Balance | 356 |
| 69 | 5.2 | 1.9 | 0.09 | Balance | 477 |
| 70 | 4.0 | 2.1 | 0.38 | Balance | 480 |
| 71 | 5.2 | 0.6 | 0.21 | Balance | 343 |
| 72 | 5.9 | 0.8 | 0.42 | Balance | 400 |

*including inevitable impurities

TABLE 4

| Filler No. | Alloy Composition (% by mass) | | | | | | | | | |
|---|---|---|---|---|---|---|---|---|---|---|
| | Mg | Mn | Cr | Zr | Si | Fe | Cu | Zn | Ti | Al* |
| 1 | 7.1 | 0.34 | 0.18 | 0.01 | 0.06 | 0.16 | 0.05 | 0.08 | 0.02 | Balance |
| 2 | 6.2 | 1.00 | 0.09 | 0.04 | 0.00 | 0.33 | 0.07 | 0.21 | 0.22 | Balance |
| 3 | 5.8 | 0.75 | 0.16 | 0.02 | 0.33 | 0.13 | 0.03 | 0.24 | 0.04 | Balance |
| 4 | 7.1 | 0.08 | 0.20 | 0.05 | 0.27 | 0.20 | 0.05 | 0.15 | 0.19 | Balance |
| 5 | 7.7 | 0.42 | 0.19 | 0.00 | 0.38 | 0.17 | 0.09 | 0.00 | 0.02 | Balance |
| 6 | 7.6 | 0.68 | 0.05 | 0.04 | 0.08 | 0.18 | 0.05 | 0.13 | 0.07 | Balance |
| 7 | 7.1 | 0.41 | 0.12 | 0.05 | 0.25 | 0.34 | 0.06 | 0.22 | 0.22 | Balance |
| 8 | 7.4 | 0.93 | 0.16 | 0.02 | 0.05 | 0.12 | 0.04 | 0.13 | 0.06 | Balance |
| 9 | 7.4 | 0.07 | 0.19 | 0.02 | 0.10 | 0.29 | 0.07 | 0.11 | 0.20 | Balance |
| 10 | 5.5 | 0.79 | 0.10 | 0.03 | 0.18 | 0.19 | 0.02 | 0.03 | 0.22 | Balance |
| 11 | 6.1 | 0.79 | 0.08 | 0.00 | 0.17 | 0.19 | 0.05 | 0.22 | 0.09 | Balance |
| 12 | 6.3 | 0.02 | 0.11 | 0.01 | 0.20 | 0.18 | 0.07 | 0.11 | 0.12 | Balance |
| 13 | 7.3 | 0.29 | 0.08 | 0.02 | 0.38 | 0.03 | 0.02 | 0.09 | 0.24 | Balance |
| 14 | 6.2 | 0.43 | 0.09 | 0.03 | 0.08 | 0.37 | 0.00 | 0.03 | 0.09 | Balance |
| 15 | 6.9 | 0.02 | 0.10 | 0.02 | 0.31 | 0.19 | 0.04 | 0.10 | 0.03 | Balance |
| 16 | 7.8 | 0.42 | 0.05 | 0.04 | 0.39 | 0.01 | 0.05 | 0.06 | 0.11 | Balance |
| 17 | 7.6 | 0.40 | 0.09 | 0.02 | 0.17 | 0.21 | 0.10 | 0.07 | 0.06 | Balance |
| 18 | 7.4 | 0.25 | 0.13 | 0.02 | 0.38 | 0.06 | 0.08 | 0.02 | 0.21 | Balance |
| 19 | 6.7 | 0.21 | 0.19 | 0.01 | 0.30 | 0.01 | 0.08 | 0.13 | 0.02 | Balance |
| 20 | 8.0 | 0.58 | 0.15 | 0.01 | 0.20 | 0.20 | 0.09 | 0.16 | 0.07 | Balance |
| 21 | 6.3 | 0.60 | 0.18 | 0.01 | 0.21 | 0.20 | 0.07 | 0.04 | 0.20 | Balance |
| 22 | 6.2 | 0.18 | 0.16 | 0.05 | 0.23 | 0.36 | 0.02 | 0.12 | 0.23 | Balance |
| 23 | 6.8 | 0.44 | 0.19 | 0.00 | 0.38 | 0.11 | 0.06 | 0.08 | 0.00 | Balance |
| 24 | 7.1 | 0.01 | 0.13 | 0.00 | 0.04 | 0.14 | 0.06 | 0.04 | 0.09 | Balance |
| 25 | 7.6 | 0.11 | 0.18 | 0.03 | 0.37 | 0.01 | 0.10 | 0.12 | 0.09 | Balance |

TABLE 4-continued

| Filler No. | Alloy Composition (% by mass) | | | | | | | | | |
|---|---|---|---|---|---|---|---|---|---|---|
| | Mg | Mn | Cr | Zr | Si | Fe | Cu | Zn | Ti | Al* |
| 26 | 7.8 | 0.66 | 0.15 | 0.03 | 0.18 | 0.24 | 0.01 | 0.22 | 0.03 | Balance |
| 27 | 5.8 | 0.11 | 0.05 | 0.02 | 0.36 | 0.16 | 0.09 | 0.17 | 0.09 | Balance |

*including inevitable impurities

TABLE 5

| Filler No. | Alloy Composition (% by mass) | | | | | | | | | |
|---|---|---|---|---|---|---|---|---|---|---|
| | Mg | Mn | Cr | Zr | Si | Fe | Cu | Zn | Ti | Al* |
| 31 | 2.8 | 0.13 | 0.11 | 0.01 | 0.29 | 0.07 | 0.06 | 0.03 | 0.02 | Balance |
| 32 | 2.6 | 0.79 | 0.17 | 0.05 | 0.19 | 0.18 | 0.10 | 0.11 | 0.23 | Balance |
| 33 | 5.0 | 0.67 | 0.17 | 0.03 | 0.18 | 0.27 | 0.01 | 0.24 | 0.15 | Balance |
| 34 | 3.3 | 0.19 | 0.15 | 0.03 | 0.03 | 0.23 | 0.08 | 0.19 | 0.19 | Balance |
| 35 | 3.3 | 0.23 | 0.05 | 0.01 | 0.23 | 0.33 | 0.04 | 0.23 | 0.19 | Balance |
| 36 | 4.1 | 0.95 | 0.09 | 0.00 | 0.10 | 0.38 | 0.09 | 0.13 | 0.12 | Balance |
| 37 | 2.5 | 0.39 | 0.06 | 0.02 | 0.18 | 0.21 | 0.07 | 0.09 | 0.09 | Balance |
| 38 | 4.6 | 0.69 | 0.19 | 0.04 | 0.29 | 0.27 | 0.01 | 0.09 | 0.21 | Balance |
| 39 | 5.3 | 0.72 | 0.18 | 0.00 | 0.30 | 0.09 | 0.06 | 0.17 | 0.04 | Balance |
| 40 | 4.1 | 0.19 | 0.06 | 0.02 | 0.38 | 0.11 | 0.06 | 0.12 | 0.16 | Balance |
| 41 | 5.2 | 0.91 | 0.14 | 0.04 | 0.31 | 0.27 | 0.03 | 0.00 | 0.12 | Balance |
| 42 | 4.6 | 0.78 | 0.12 | 0.00 | 0.29 | 0.21 | 0.06 | 0.15 | 0.04 | Balance |
| 43 | 2.9 | 0.54 | 0.19 | 0.04 | 0.23 | 0.15 | 0.04 | 0.18 | 0.24 | Balance |
| 44 | 3.1 | 0.50 | 0.06 | 0.03 | 0.32 | 0.28 | 0.05 | 0.11 | 0.18 | Balance |
| 45 | 3.4 | 0.49 | 0.06 | 0.02 | 0.32 | 0.18 | 0.01 | 0.02 | 0.04 | Balance |
| 46 | 3.3 | 0.73 | 0.06 | 0.03 | 0.33 | 0.39 | 0.09 | 0.09 | 0.01 | Balance |
| 47 | 5.3 | 0.91 | 0.18 | 0.02 | 0.18 | 0.37 | 0.07 | 0.16 | 0.08 | Balance |
| 48 | 3.5 | 0.60 | 0.12 | 0.02 | 0.10 | 0.15 | 0.06 | 0.12 | 0.07 | Balance |
| 49 | 4.1 | 0.73 | 0.18 | 0.02 | 0.17 | 0.24 | 0.01 | 0.15 | 0.23 | Balance |
| 50 | 4.1 | 0.28 | 0.10 | 0.04 | 0.16 | 0.20 | 0.04 | 0.15 | 0.18 | Balance |
| 51 | 3.6 | 0.43 | 0.19 | 0.00 | 0.24 | 0.27 | 0.04 | 0.14 | 0.16 | Balance |
| 52 | 2.5 | 0.90 | 0.15 | 0.01 | 0.17 | 0.09 | 0.10 | 0.19 | 0.10 | Balance |

*including inevitable impurities

TABLE 6

| Filler No. | Alloy Composition (% by mass) | | | | | | | | | |
|---|---|---|---|---|---|---|---|---|---|---|
| | Mg | Mn | Cr | Zr | Si | Fe | Cu | Zn | Ti | Al* |
| 53 | 4.6 | 0.77 | 0.05 | 0.04 | 0.36 | 0.24 | 0.09 | 0.05 | 0.14 | Balance |
| 54 | 5.0 | 0.65 | 0.17 | 0.03 | 0.18 | 0.03 | 0.03 | 0.07 | 0.12 | Balance |
| 55 | 2.7 | 0.54 | 0.10 | 0.05 | 0.19 | 0.12 | 0.04 | 0.22 | 0.13 | Balance |
| 56 | 2.5 | 0.50 | 0.11 | 0.05 | 0.21 | 0.35 | 0.05 | 0.24 | 0.07 | Balance |
| 57 | 5.0 | 0.09 | 0.08 | 0.02 | 0.32 | 0.37 | 0.05 | 0.09 | 0.14 | Balance |
| 58 | 5.8 | 0.39 | 0.10 | 0.00 | 0.11 | 0.06 | 0.02 | 0.19 | 0.25 | Balance |
| 59 | 5.6 | 0.39 | 0.08 | 0.01 | 0.20 | 0.34 | 0.09 | 0.04 | 0.23 | Balance |
| 60 | 5.8 | 0.75 | 0.16 | 0.02 | 0.20 | 0.16 | 0.00 | 0.13 | 0.24 | Balance |
| 61 | 6.8 | 1.00 | 0.13 | 0.01 | 0.36 | 0.17 | 0.04 | 0.17 | 0.13 | Balance |
| 62 | 6.3 | 0.55 | 0.14 | 0.03 | 0.17 | 0.24 | 0.06 | 0.18 | 0.03 | Balance |
| 63 | 8.0 | 0.86 | 0.14 | 0.04 | 0.27 | 0.04 | 0.04 | 0.15 | 0.18 | Balance |
| 64 | 7.8 | 0.50 | 0.06 | 0.04 | 0.07 | 0.30 | 0.02 | 0.21 | 0.09 | Balance |
| 65 | 7.6 | 0.62 | 0.03 | 0.02 | 0.26 | 0.26 | 0.00 | 0.21 | 0.09 | Balance |
| 66 | 5.9 | 0.78 | 0.28 | 0.01 | 0.40 | 0.24 | 0.07 | 0.01 | 0.21 | Balance |
| 67 | 5.7 | 0.61 | 0.05 | 0.12 | 0.03 | 0.04 | 0.10 | 0.11 | 0.01 | Balance |
| 68 | 8.4 | 0.97 | 0.16 | 0.01 | 0.51 | 0.26 | 0.04 | 0.25 | 0.15 | Balance |
| 69 | 6.5 | 0.76 | 0.12 | 0.01 | 0.28 | 0.55 | 0.01 | 0.15 | 0.09 | Balance |
| 70 | 6.8 | 0.73 | 0.08 | 0.02 | 0.25 | 0.16 | 0.22 | 0.24 | 0.15 | Balance |
| 71 | 7.8 | 0.53 | 0.06 | 0.00 | 0.25 | 0.40 | 0.04 | 0.33 | 0.04 | Balance |
| 72 | 7.8 | 0.92 | 0.16 | 0.00 | 0.31 | 0.27 | 0.08 | 0.15 | 0.29 | Balance |

*including inevitable impurities

Then, the base materials made of the respective Al members shown in Table 1 to Table 3 were each used in pairs. The ends in the extrusion direction of each of the pairs of the base materials were butted. Then, as indicated in the following Table 7 to Table 9, welding tests were carried out, in which MIG welding is performed by using the filler metals of the same number indicated in the above Table 4 to Table 6. As the condition of MIG welding, current of 210 A, welding speed of 80 cm/minute, and shield gas of Ar (flow rate: 10 to 15 L/minute) were employed.

Subsequently, the artificial aging treatment of 150° C.×8 hours was performed on the joined product obtained in each of the welding tests. As a result, various intended frame members for use in a two-wheeled vehicle and an all-terrain vehicle that were T6 tempered were produced.

Each of the obtained frame members for use in a two-wheeled vehicle and an all-terrain vehicle was evaluated by observing a cross section of a weld joint region thereof by using a microscope to confirm if crack was occurred in the weld joint region. Further, a tensile test was carried out on each of the weld joint regions to measure the strength and elongation of the joint and to observe the fractured position. Specifically, a No. 5 test piece for tensile test defined in JIS-Z-2201 was cut out from the frame member (weld joined body) for use in a two-wheeled vehicle and an all-terrain vehicle such that the length direction of the test piece was coincidence with the extrusion direction of the base material and that the weld metal region was positioned at the middle portion of the test piece. Then, the tensile test was carried out in accordance with JIS-Z-2241 with excess weld metals were left as they were. The fractured position was evaluated as following criteria: the fracture or breakage occurred at the weld metal region; the fracture occurred at the boundary position (bonding region) between the weld metal region and the base material; and the fracture occurred at the heat-affected zone (HAZ) in the base material.

The results of the above-described test and evaluations are also shown in the following Table 7 to Table 9.

TABLE 7

| Welding Test | Base Material No. | Filler No. | Strength (MPa) | Elongation (%) | Fractured position | Weld crack sensitivity |
|---|---|---|---|---|---|---|
| 1 | 1 | 1 | 212 | 5.5 | HAZ | no crack |
| 2 | 2 | 2 | 353 | 5.2 | HAZ | no crack |
| 3 | 3 | 3 | 339 | 4.5 | HAZ | no crack |
| 4 | 4 | 4 | 276 | 5.2 | HAZ | no crack |
| 5 | 5 | 5 | 344 | 6.2 | HAZ | no crack |
| 6 | 6 | 6 | 356 | 6.3 | HAZ | no crack |
| 7 | 7 | 7 | 369 | 5.5 | HAZ | no crack |
| 8 | 8 | 8 | 381 | 6.3 | HAZ | no crack |
| 9 | 9 | 9 | 361 | 5.5 | HAZ | no crack |
| 10 | 10 | 10 | 391 | 4.3 | HAZ | no crack |
| 11 | 11 | 11 | 399 | 4.9 | HAZ | no crack |
| 12 | 12 | 12 | 354 | 4.4 | HAZ | no crack |
| 13 | 13 | 13 | 359 | 5.6 | HAZ | no crack |
| 14 | 14 | 14 | 369 | 4.6 | HAZ | no crack |
| 15 | 15 | 15 | 385 | 4.9 | HAZ | no crack |
| 16 | 16 | 16 | 378 | 6.3 | HAZ | no crack |
| 17 | 17 | 17 | 365 | 6.0 | HAZ | no crack |
| 18 | 18 | 18 | 366 | 5.7 | HAZ | no crack |
| 19 | 19 | 19 | 401 | 4.9 | HAZ | no crack |
| 20 | 20 | 20 | 410 | 6.5 | HAZ | no crack |
| 21 | 21 | 21 | 402 | 4.9 | HAZ | no crack |
| 22 | 22 | 22 | 393 | 4.4 | HAZ | no crack |
| 23 | 23 | 23 | 406 | 5.3 | HAZ | no crack |
| 24 | 24 | 24 | 413 | 5.1 | HAZ | no crack |
| 25 | 25 | 25 | 414 | 5.7 | HAZ | no crack |
| 26 | 26 | 26 | 473 | 6.4 | HAZ | no crack |
| 27 | 27 | 27 | 438 | 4.0 | HAZ | no crack |

HAZ: Heat-Affected Zone

TABLE 8

| Welding Test | Base Material No. | Filler No. | Strength (MPa) | Elongation (%) | Fractured Position | Weld crack sensitivity |
|---|---|---|---|---|---|---|
| 31 | 31 | 31 | 196 | 1.0 | bonding region | no crack |
| 32 | 32 | 32 | 335 | 1.2 | bonding region | no crack |
| 33 | 33 | 33 | 313 | 3.3 | bonding region | no crack |
| 34 | 34 | 34 | 249 | 1.3 | bonding region | no crack |
| 35 | 35 | 35 | 360 | 1.4 | bonding region | no crack |
| 36 | 36 | 36 | 353 | 2.8 | bonding region | no crack |
| 37 | 37 | 37 | 357 | 1.0 | bonding region | no crack |
| 38 | 38 | 38 | 360 | 3.0 | bonding region | no crack |
| 39 | 39 | 39 | 363 | 3.6 | bonding region | no crack |
| 40 | 40 | 40 | 337 | 2.1 | bonding region | no crack |
| 41 | 41 | 41 | 365 | 3.7 | bonding region | no crack |
| 42 | 42 | 42 | 370 | 3.0 | bonding region | no crack |
| 43 | 43 | 43 | 407 | 1.3 | bonding region | no crack |
| 44 | 44 | 44 | 383 | 1.5 | bonding region | no crack |
| 45 | 45 | 45 | 361 | 1.7 | bonding region | no crack |
| 46 | 46 | 46 | 416 | 1.8 | bonding region | no crack |
| 47 | 47 | 47 | 389 | 3.8 | bonding region | no crack |
| 48 | 48 | 48 | 401 | 1.9 | bonding region | no crack |
| 49 | 49 | 49 | 397 | 2.6 | bonding region | cracked |
| 50 | 50 | 50 | 371 | 2.1 | bonding region | cracked |
| 51 | 51 | 51 | 401 | 1.8 | bonding region | no crack |
| 52 | 52 | 52 | 410 | 1.2 | bonding region | cracked |

TABLE 9

| Welding Test | Base Material No. | Filler No. | Strength (MPa) | Elongation (%) | Fractured Position | Weld Crack Sensitivity |
|---|---|---|---|---|---|---|
| 53 | 53 | 53 | 422 | 3.0 | bonding region | cracked |
| 54 | 54 | 54 | 436 | 3.3 | bonding region | no crack |

TABLE 9-continued

| Welding Test | Base Material No. | Filler No. | Strength (MPa) | Elongation (%) | Fractured Position | Weld Crack Sensitivity |
|---|---|---|---|---|---|---|
| 55 | 55 | 55 | 457 | 1.1 | bonding region | cracked |
| 56 | 56 | 56 | 439 | 1.0 | bonding region | cracked |
| 57 | 57 | 57 | 429 | 2.8 | bonding region | no crack |
| 58 | 58 | 58 | 180 | 4.2 | HAZ | no crack |
| 59 | 59 | 59 | 184 | 4.0 | HAZ | no crack |
| 60 | 60 | 60 | 470 | 2.0 | HAZ | no crack |
| 61 | 61 | 61 | 177 | 5.8 | HAZ | no crack |
| 62 | 62 | 62 | 485 | 1.6 | HAZ | no crack |
| 63 | 63 | 63 | 186 | 6.9 | HAZ | no crack |
| 64 | 64 | 64 | 190 | 6.3 | HAZ | no crack |
| 65 | 65 | 65 | 308 | 6.3 | HAZ | cracked |
| 66 | 66 | 66 | fractured in the drawing process | | | |
| 67 | 67 | 67 | fractured in the drawing process | | | |
| 68 | 68 | 68 | fractured in the drawing process | | | |
| 69 | 69 | 69 | fractured in the drawing process | | | |
| 70 | 70 | 70 | 147 | 1.0 | bonding region | cracked |
| 71 | 71 | 71 | 178 | 1.2 | HAZ | no crack |
| 72 | 72 | 72 | fractured in the drawing process | | | |

HAZ: Heat-Affected Zone

As apparent from the results shown in Table 7 to Table 9, in the welding tests 1 to 27 in which the base materials (Nos. 1 to 27) made of the 7000 series Al alloys each having the alloy composition of the present invention were MIG welded by using the filler metals (Nos. 1 to 27) each having the alloy composition of the present invention, the weld joints excellent in physical properties such as strength and elongation and also excellent in weld crack sensitivity were obtained. Further, the fractured positions thereof were heat-affected zones (HAZ). Thus, it was confirmed that the frame members for use in a two-wheeled vehicle and an all-terrain vehicle (a weld joint structure) showing excellent fracture characteristics can be obtained.

Compared to the results described above, in the welding tests 31 to 72 in which the respective Al members to be welded had the alloy compositions out of the range of the present invention (base materials Nos. 58 to 64) or the respective filler metals had the alloy compositions out of the range of the present invention (base materials Nos. 31 to 57 and 65 to 72), various problems were occurred. For example, in the frame members of the welding tests 31 to 72, elongation was deteriorated, strength was insufficient, the fractured position was the bonding region or weld metal region, crack was occurred during welding, and crack was occurred in the drawing process of the filler metal. Thus, it was revealed that the frame members of the welding tests 31 to 72 have some problems when used as a frame member for use in a two-wheeled vehicle and an all-terrain vehicle.

What is claimed is:

1. A frame member for use in a two-wheeled vehicle and an all-terrain vehicle, comprising a plurality of Al members each formed of a 7000 series Al alloy consisting of Cu: 0.01 to 0.50%, Mg: 0.5 to 2.1%, and Zn: 4.0 to 8.5% on a mass basis, the balance being Al and inevitable impurities, the plurality of Al members being integrated by welding and subjected to one of a T4 treatment and a T6 treatment,
wherein the plurality of Al members are integrally connected by means of a weld joint formed by welding using a filler metal consisting of Mg: 5.5 to 8.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less on a mass basis, the balance being Al and inevitable impurities.

2. The frame member for use in a two-wheeled vehicle and an all-terrain vehicle according to claim 1, wherein the 7000 series Al alloy contains Mg in an amount of 1.0 to 2.1% by mass.

3. The frame member for use in a two-wheeled vehicle and an all-terrain vehicle according to claim 1, wherein the 7000 series Al alloy contains Mg in an amount of 1.2 to 2.1% by mass and Zn in an amount of 5.0 to 8.5% by mass.

4. The frame member for use in a two-wheeled vehicle and an all-terrain vehicle according to claim 1, wherein the 7000 series Al alloy contains Mg in an amount of 1.2 to 2.1% by mass and Zn in an amount of 6.0 to 8.5% by mass.

5. The frame member for use in a two-wheeled vehicle and an all-terrain vehicle according to claim 1, wherein the 7000 series Al alloy contains Mg in an amount of 1.3 to 2.1% by mass and Zn in an amount of 7.5 to 8.5% by mass.

6. A frame member for use in a two-wheeled vehicle and an all-terrain vehicle, comprising a plurality of Al members each formed of a 7000 series Al alloy consisting of Cu: 0.01 to 0.50%, Mg: 0.5 to 2.1%, and Zn: 4.0 to 8.5% on a mass basis, the balance being Al and inevitable impurities, the plurality of Al members being integrated by welding and subjected to one of a T4 treatment and a T6 treatment,
wherein the plurality of Al members are integrally connected by means of a weld joint formed by welding using a filler metal consisting of Mg: 5.5 to 8.0%, Mn: 0.05 to 1.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less on a mass basis, the balance being Al and inevitable impurities.

7. A method of producing a frame member for use in a two-wheeled vehicle and an all-terrain vehicle, comprising the steps of:
welding a plurality of Al members each formed of a 7000 series Al alloy by using a filler metal to prepare a joined product, the 7000 series Al alloy consisting of Cu: 0.01 to 0.50%, Mg: 0.5 to 2.1%, and Zn: 4.0 to 8.5% on a mass basis, the balance being Al and inevitable impurities, and the filler metal consisting of Mg: 5.5 to 8.0%, Cr: 0.05 to 0.25%, Ti: 0.25% or less, Si: 0.4% or less, Fe: 0.4% or less, Cu: 0.1% or less, Zr: 0.05% or less and Zn: 0.25% or less on a mass basis, the balance being Al and inevitable impurities, and
performing one of a T4 treatment and a T6 treatment on the joined product.

8. The method of producing a frame member for use in a two-wheeled vehicle and an all-terrain vehicle according to claim 7, wherein the plurality of Al members are welded by one of arc welding, laser welding, and electron beam welding.

9. The method of producing a frame member for use in a two-wheeled vehicle and an all-terrain vehicle according to claim 7, wherein when the T4 treatment is performed on the joined product, the T4 treatment includes a solution heat treatment that is performed on the plurality of Al members before welding and a natural aging treatment that is performed on the joined product obtained by welding.

10. The method of producing a frame member for use in a two-wheeled vehicle and an all-terrain vehicle according to claim 7, wherein when the T6 treatment is performed on the joined product, the T6 treatment includes a solution heat treatment that is performed on the plurality of Al members before welding and an artificial aging treatment that is performed on the joined product obtained by welding.

* * * * *